(12) United States Patent
Lee et al.

(10) Patent No.: US 7,718,322 B2
(45) Date of Patent: May 18, 2010

(54) ELECTROLYTE FOR RECHARGEABLE LITHIUM BATTERY AND RECHARGEABLE LITHIUM BATTERY COMPRISING SAME

(75) Inventors: Yong-Beom Lee, Suwon-si (KR);
Eui-Hwan Song, Suwon-si (KR);
Kwang-Sup Kim, Suwon-si (KR);
Tae-Shik Earmme, Suwon-si (KR);
You-Mee Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1448 days.

(21) Appl. No.: 10/924,248

(22) Filed: Aug. 20, 2004

(65) Prior Publication Data

US 2005/0084765 A1    Apr. 21, 2005

(30) Foreign Application Priority Data

Aug. 20, 2003 (KR) ............... 10-2003-0057716
Jan. 29, 2004 (KR) ............... 10-2004-0005874

(51) Int. Cl.
*H01M 6/16* (2006.01)
*H01M 10/40* (2006.01)

(52) U.S. Cl. ............... 429/339; 429/338; 429/231.95; 429/306; 429/329; 429/330; 429/324; 429/326

(58) Field of Classification Search ............... None
See application file for complete search history.

(56) References Cited

U.S. PATENT DOCUMENTS

| | | | |
|---|---|---|---|
| 4,737,424 A * | 4/1988 | Tobishima et al. | 429/331 |
| 5,079,109 A | 1/1992 | Takami et al. | |
| 5,272,022 A | 12/1993 | Takami et al. | |
| 5,521,027 A | 5/1996 | Okuno et al. | |
| 5,552,243 A | 9/1996 | Klein | |
| 5,707,763 A | 1/1998 | Shimizu et al. | |
| 5,851,693 A | 12/1998 | Sano et al. | |
| 6,045,951 A | 4/2000 | Wendsjö et al. | |
| 6,117,596 A | 9/2000 | Lee et al. | |
| 6,521,380 B1 | 2/2003 | Ryu et al. | |
| 6,929,885 B2 | 8/2005 | Kotato et al. | |
| 7,223,500 B2 | 5/2007 | Noh et al. | |
| 7,229,718 B2 * | 6/2007 | Yamaguchi et al. | 429/326 |

(Continued)

FOREIGN PATENT DOCUMENTS

CN 1151619 A 6/1997

(Continued)

OTHER PUBLICATIONS

European Search Report, dated Jan. 10, 2005, for application No. 04090320.5, in the name of Samsung SDI Co., Ltd.

(Continued)

*Primary Examiner*—Dah-Wei Yuan
*Assistant Examiner*—Angela J Martin
(74) *Attorney, Agent, or Firm*—Christie, Parker & Hale, LLP

(57) ABSTRACT

Disclosed in an electrolyte for a rechargeable lithium battery, including a mixture of organic solvents including a cyclic solvent and a nitrile-based solvent represented by formula 1 and a lithium salt.

73 Claims, 2 Drawing Sheets

U.S. PATENT DOCUMENTS

| | | | |
|---|---|---|---|
| 2003/0118904 A1 | 6/2003 | Hosokawa et al. | |
| 2004/0013946 A1* | 1/2004 | Abe et al. | 429/326 |
| 2004/0106047 A1 | 1/2004 | Mie et al. | |

FOREIGN PATENT DOCUMENTS

| | | |
|---|---|---|
| CN | 1263363 | 8/2000 |
| CN | 1274956 | 11/2000 |
| CN | 1317843 A | 10/2001 |
| CN | 1497765 A | 5/2004 |
| EP | 0 478 379 A2 | 4/1992 |
| EP | 0 478 379 A3 | 4/1992 |
| EP | 1 146 587 A2 | 10/2001 |
| EP | 0 757 399 B1 | 4/2003 |
| EP | 1 406 336 A1 | 4/2004 |
| EP | 1406336 A * | 4/2004 |
| EP | 1 146 587 A3 | 4/2005 |
| JP | 52-71630 | 6/1977 |
| JP | 4-206167 | 7/1992 |
| JP | 5-144470 | 6/1993 |
| JP | 06-020721 | 1/1994 |
| JP | 7-320748 | 12/1995 |
| JP | 09-073919 | 3/1997 |
| JP | 9-097626 | 4/1997 |
| JP | 10-189043 | 7/1998 |
| JP | 10-312825 | 11/1998 |
| JP | 11-040199 | 2/1999 |
| JP | 2000-124077 | 4/2000 |
| JP | 2000-235868 | 8/2000 |
| JP | 2001-126761 | 5/2001 |
| JP | 2001-167797 | 6/2001 |
| JP | 2001-176555 A | 6/2001 |
| JP | 2002-083630 | 3/2002 |
| JP | 2002-134101 | 5/2002 |
| JP | 2002-203561 | 7/2002 |
| JP | 2002-343430 | 11/2002 |
| JP | 2003-07333 | 1/2003 |
| JP | 200307336 | 1/2003 |
| JP | 2003-68137 A | 3/2003 |
| JP | 2003-510792 T | 3/2003 |
| JP | 2003086247 | 3/2003 |
| KR | 1999-0053023 | 7/1999 |
| KR | 2001-0006825 | 1/2001 |
| KR | 10-2003-00793 10 | 10/2003 |
| KR | 10-2004-0038679 | 5/2004 |
| WO | WO 01/24305 A1 | 4/2001 |
| WO | WO 02/071528 A2 | 9/2002 |
| WO | WO 03/079381 A1 * | 9/2003 |
| WO | WO 2004/023577 A2 | 3/2004 |
| WO | WO 2004/023577 A3 | 3/2004 |

OTHER PUBLICATIONS

European Patent Office Patent Abstracts of Japan for publication No. 2000124077, publication date of Apr. 28, 2000, in the name of A. Yoshida.

European Patent Office Patent Abstracts of Japan for publication No. 07320748, publication date of Dec. 8, 1995, in the name of T. Saito.

European Patent Office Patent Abstracts of Japan for publication No. 2003086247, publication date of Mar. 20, 2003, in the name of W. Martin.

European Patent Office Patent Abstracts of Japan for publication No. 05144470, publication date of Jun. 11, 1993, in the name of F. Kita.

European Patent Office Patent Abstracts of Japan for publication No. 2003007336, publication date of Jan. 10, 2003, in the name of M. Ue.

Patent Abstracts of Japan for publication No. 52-071630, publication date of Jun. 15, 1977, in the name of K. Yokoyama.

Patent Abstracts of Japan for Publication No. 04-206167; Date of publication of application Jul. 28, 1992, in the name of Norihito Kurisu et al.

Patent Abstract of Japanese Patent JP2000235868, Published Aug. 29, 2000, for Takami, et al.

Takami, et al., "New thin lithium-ion batteries using a liquid electrolyte with thermal stability" Journal of Power Sources 97-98 (2001) pp. 677-680.

Patent Abstracts of Japan, Publication No. 2001-176555, dated Jun. 29, 2001, in the name of Takashi Nishikawa et al.

Patent Abstracts of Japan, Publication No. 2003-068137, dated Mar. 7, 2003, in the name of Satoru Mori et al.

Korean Patent Abstracts for Publication No. 100400216; Date of publication of application Sep. 19, 2003; Application No. 10-1997-0072591; in the name of Seok Gwang Doo.

Korean Patent Abstracts for Publication No. 1020010006825; Date of publication of application: Jan. 26, 2001, in the name of Noboru Oyama.

U.S. Office action dated May 7, 2009, for related U.S. Appl. No. 11/174,075, noting listed U.S. Appl. No. 6,045,951 in this IDS.

Patent Abstracts of Japan, Publication No. 06-020721, dated Jan. 28, 1994, in the name of Takayuki Nakajima et al.

Patent Abstracts of Japan, Publication No. 09-073919, dated Mar. 18, 1997, in the name of Terumi Ogawa et al.

Patent Abstracts of Japan, Publication No. 09-097626, dated Apr. 8, 1997, in the name of Nauyuki Sugano et al,.

Patent Abstracts of Japan, Publication No. 10-189043, dated Jul. 21, 1998, in the name of Juichi Arai et al.

Patent Abstracts of Japan, Publication No. 10-312825, dated Nov. 24, 1998, in the name of Aiicuiro Fujiwara et al.

Patent Abstracts of Japan, Publication No. 11-040199, dated Feb. 12, 1999, in the name of H. Katayama et al.

Patent Abstracts of Japan, Publication No. 2001-126761; dated May 11, 2001; in the name of Kotado et al.

Patent Abstracts of Japan, Publication No. 2001-167797; dated Jun. 22, 2001; in the name of Shibuya et al.

Patent Abstracts of Japan, Publication No. 2002-083630, dated Mar. 22, 2002, in the name of Nao Shimura et al,.

Patent Abstracts of Japan, Publication No. 2002-134101; dated May 10, 2002; in the name of Tatsuya Hashimoto et at.

Patent Abstracts of Japan, Publication No. 2002-203561; dated Jul. 19, 2002; in the name of Tetsuo Seto et al.

Patent Abstracts of Japan, Publication No. 2002-343430, dated Nov. 29, 2002, in the name of Minoru Kotado et al.

Patent Abstracts of Japan, Publication No. 2003-007333, dated Jan. 10, 2003, in the name of Masahiro Takehara et al.

Korean Patent Abstracts, Publication No. 1020030079310, dated Oct. 10, 2003, in the name of Jun-Ho Kim et al.

Korean Patent Abstracts, Publication No. 1020040038679, dated May 8, 2004, in the name of Akio Hiwara et al.

U.S. Office action dated Nov. 3, 2009, for related U.S. Appl. No. 11/174,075, noting listed references in this IDS.

* cited by examiner

ELECTROLYTE FOR RECHARGEABLE LITHIUM BATTERY AND RECHARGEABLE LITHIUM BATTERY COMPRISING SAME

CROSS REFERENCE TO RELATED APPLICATION

This application is based on and claims priority of Korean Patent Application Nos. 2003-57716 and 2004-5874 filed in the Korean Intellectual Property Office on Aug. 20, 2003 and Jan. 29, 2004, respectively, the entire disclosures of which are incorporated hereinto by reference.

FIELD OF THE INVENTION

The present invention relates to an electrolyte for a rechargeable lithium battery and a rechargeable lithium battery comprising the same, and more particularly, to an electrolyte for a rechargeable lithium battery exhibiting improved storage characteristics and suppression of swelling at high temperatures, and a rechargeable lithium battery comprising the same.

BACKGROUND OF THE INVENTION

Recently, the rapid development of smaller, lighter, and higher performance electronic and communication equipment has required the development of high performance and large capacity batteries to power such equipment. The demands for large capacity batteries have led to investigations into rechargeable lithium batteries. Positive active materials for rechargeable lithium batteries generally use lithium-transition metal oxides, and negative active materials generally use crystalline or amorphous carbonaceous materials or carbon composites. The active materials are coated on a current collector with a predetermined thickness and length, or they are formed as a film to produce electrodes. The electrodes together with a separator are wound to produce an electrode element, and the electrode element is inserted into a battery case such as a can followed by insertion of an electrolyte to fabricate a battery.

The electrolyte includes lithium salts and organic solvents. The organic solvents may be mixed solvents of between two and five components of cyclic carbonates such as ethylene carbonate or propylene carbonate, or linear carbonates such as dimethyl carbonate, ethylmethyl carbonate, or diethyl carbonate. However, these solvents are known to severely expand at high temperatures, causing a swelling phenomenon. The swelling phenomenon is partly manifested in a battery by gas generated due to decomposition of the electrolyte at high temperatures in the battery.

Such a swelling phenomenon can be reduced in lithium polymer batteries compared to lithium ion batteries. However, the use of a polymer electrolyte with a nickel-based positive active material (e.g. LiNiMO$_2$, where M is selected from Co, Mn, Al, P, Fe or Mg) has generally been ineffective.

Several attempts to use solvents with a high boiling point and a high dielectric constant, such as γ-butyrolactone, have been promising. Conventionally, the high dielectric constant solvent is generally used together with ethylene carbonate, which results in an extremely high viscosity with poor wettability of the separator. In another attempt, solvents with low boiling points and low dielectric constants have been used. However, these attempts still have problems associated with high swelling (Japanese Patent Laid-Open No. 2000-235868, U.S. Pat. Nos. 5,079,109, 5,272,022, 5,552,243, 5,521,027, 6,117,596, and 5,851,693, and "New thin lithium-ion batteries using a liquid electrolyte with thermal stability" Journal of power sources, 97-98, 677-680(2001), Notio Takami et al.)

Other attempts to inhibit the swelling phenomenon are in U.S. Pat. No. 4,830,939 disclosing a liquid electrolyte containing a polyethylenically unsaturated monomeric material or a prepolymeric material, and U.S. Pat. No. 4,866,716 disclosing a cross-linked polyether which is a product of a vinylether. In addition, U.S. Pat. No. 4,970,012 discloses that a polymeric solid electrolyte includes crosslinked molecules of a radiation-cured substance of a cinnamate ester and polyethene oxide, and U.S. Pat. No. 4,908,283 discloses that a polymeric electrolyte includes a cured product of an acryloyl-denaturated polyalkylene oxide.

Such a swelling phenomenon is especially severe in batteries with a mixture of a lithium cobalt-based compound and a lithium nickel-based compound which exhibits higher capacity than other compounds.

SUMMARY OF THE INVENTION

In one embodiment of the invention an electrolyte is provided for a rechargeable lithium battery which is capable of inhibiting high-temperature swelling.

In another embodiment of the invention, a rechargeable lithium battery is provided which includes the electrolyte.

These and other aspects may be achieved by an electrolyte for a rechargeable lithium battery including a non-aqueous organic solvent and a lithium salt. In one embodiment of the invention, the non-aqueous organic solvent includes 70 to 95 volume % of an ester-based solvent, the ester-based solvent including a cyclic ester, and a nitrile-based solvent represented by formula 1 of 5 to 30 volume %:

$$R\!-\!C\!\equiv\!N \qquad (1)$$

where R is a $C_1$ to $C_{10}$ aliphatic hydrocarbon or halogenated aliphatic hydrocarbon, or a $C_6$ to $C_{10}$ aromatic hydrocarbon or halogenated aromatic hydrocarbon.

In yet another embodiment of the invention, a rechargeable lithium battery is provided including the electrolyte, a positive electrode and a negative electrode. The positive electrode and the negative electrode include active material in which lithium intercalation reversibly occurs. Preferably, the positive active material is a nickel-included compound.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Figure 1:
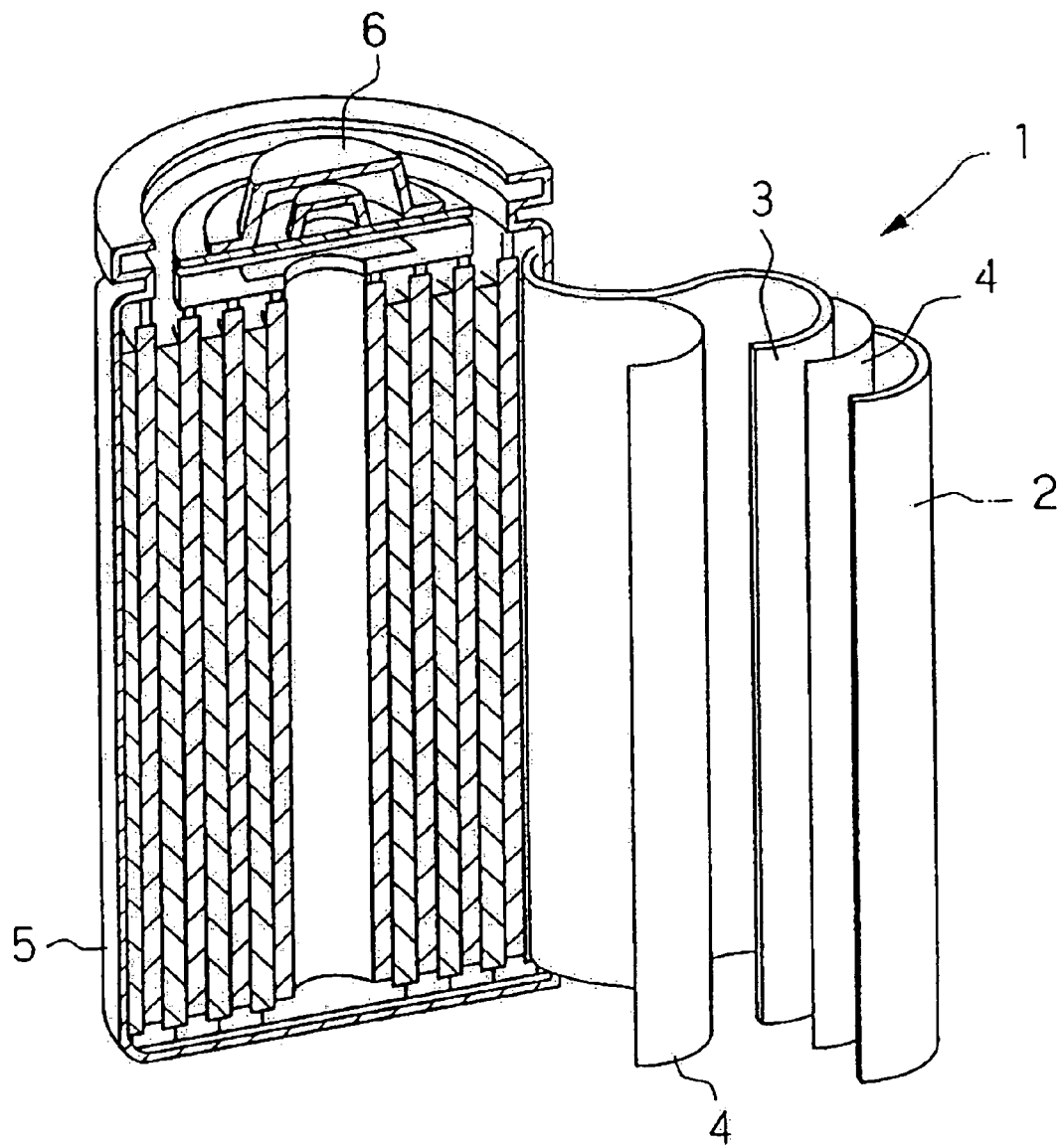
FIG. 1 is a schematic view showing a rechargeable lithium battery according to the present invention.

The present invention relates to an electrolyte including a nitrile-based solvent for improving swelling and battery performance. The electrolyte of the present invention includes non-aqueous organic solvents and a lithium salt. The non-aqueous organic solvents include an ester-based solvent including a cyclic ester and a nitrile-based solvent.

The nitrile-based solvent is represented by formula 1:

$$R-C\equiv N \quad (1)$$

where R is a $C_1$ to $C_{10}$ hydrocarbon or halogenated hydrocarbon, preferably a $C_6$ to $C_{10}$ aromatic hydrocarbon or halogenated aromatic hydrocarbon, or a $C_3$ to $C_8$ aliphatic hydrocarbon or halogenated aliphatic hydrocarbon, and more preferably a $C_6$ to $C_8$ aliphatic hydrocarbon or halogenated aliphatic hydrocarbon. Higher alkyl groups with a higher number of carbons are preferred because they have increased boiling points so that stability is improved, and the decomposition on the aliphatic hydrocarbons rarely occurs compared to the aromatic hydrocarbons. If the R is an unsaturated hydrocarbon, e.g. methacrylate, it can be used as a solvent for an electrolyte.

Examples of the nitrile-based solvent include acetonitrile, propionitrile, butyronitrile, t-butyl cyanide, valeronitrile, caprylonitrile, heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, and 4-fluoroacetonitrile.

A low viscosity and high dielectric constant of the nitrile-based compound can repress the swelling phenomenon.

The nitrile-based solvent is preferably present in an amount from 5 to 30 volume %, and more preferably 15 to 25 volume %. An amount of less than 5 volume % of the nitrile-based cannot achieve the desired swelling inhibition. An amount of more than 30 volume % deteriorates the battery performance. That is, the effect of the present invention cannot be obtained from an amount of more than 30 volume %. It is expected that Japanese Patent Laid-Open No. 2000-124077 using 60 volume % or more of acetonitrile causes the deterioration of the battery performance and problems associated with safety. Such problems are also expected in U.S. Pat. No. 6,190,804 in which nitrile is only used as a solvent for preparing a solid electrolyte, and where the amount of the nitrile used is not disclosed.

The electrolyte of the present invention includes an ester-based solvent including a cyclic ester in an amount of 70 to 95 volume %. The cyclic ester preferably includes 10 to 40 volume % of ethylene carbonate, and more preferably 10 to 15 volume % with respect to the electrolyte. An amount of more than 40 volume % of the ethylene carbonate cannot achieve the desired swelling inhibition. An amount of less than 10 volume % deteriorates the battery performance. Thus, it is expected that the effect of the use of the ethylene carbonate of the present invention cannot be obtained from Japanese Patent Laid-Open No. Hei. 7-320748 disclosing ethylene carbonate at 25 to 95 volume %.

The remaining amount, 30 to 85 volume %, and preferably 55 to 85 volume % with respect to the electrolyte, may be propylene carbonate, butylene carbonate, γ-butyrolactone, γ-valerolactone, γ-caprolactone, δ-valerolactone, ∈-valerolactone, or a mixture thereof.

The electrolyte of the present invention may further include a linear ester. The amount of the linear ester is preferably between 0 parts by volume and 70 parts by volume based on 100 parts by volume of the total cyclic ester and the nitrile-based solvents. If the amount of the linear ester is more than 70 parts by volume, swelling occurs.

The linear ester preferably includes at least one compound selected from dimethyl carbonate, ethyl methyl carbonate, diethyl carbonate, dipropyl carbonate, dibutyl carbonate, methyl acetate, ethyl acetate, methyl hexanoate, methyl formate, and mixtures thereof.

The electrolyte of the present invention may further include carbonate-based additives with a substitution group selected from halogens, a cyano (CN), or a nitro ($NO_2$), and additives such as vinylene carbonate, divinylsulfone, or ethylene sulfite. The additives help to improve the battery performance such as through inhibition of high-temperature swelling, and by increasing capacity, cycle life, and low-temperature characteristics. The carbonate-based additive is preferably an ethylene carbonate derivative represented by the following formula 5, and is more preferably fluoroethylene carbonate.

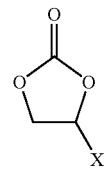

(5)

where X is selected from the group consisting of halogens, a cyano (CN) or a nitro ($NO_2$).

The amount of the carbonate-based additive is from 0.01 to 10 parts by weight based on 100 parts by weight of the total weight of the electrolyte, and preferably from 0.01 to 5 parts by weight. A carbonate-based additive of less than 0.01 parts by weight cannot effectively suppress gas generation, and that of more than 10 parts by weight deteriorates high-temperature cycle life characteristics and causes swelling to occur.

The lithium salt acts as a source for supplying lithium ions in the battery, and helps the working of the battery. Examples of suitable lithium salts are $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ where x and y are natural numbers, $LiSO_3CF_3$, and mixtures thereof.

The concentration of the lithium salt is from 0.6 to 2.0M, and preferably from 0.7 to 1.6M. If the concentration of the lithium salt is less than 0.6M, the viscosity of the electrolyte decreases, thereby deteriorating electrolyte performance. If the concentration of the lithium salt if more than 2.0M, the viscosity increases, thereby reducing transfer of lithium ions.

The electrolyte of the present invention is present in the form of liquid electrolyte, or as a solid polymeric electrolyte. The solid polymeric electrolyte is obtained from a composition for preparing a polymer electrolyte by addition of monomer and a polymeric initiator to the liquid electrolyte, i.e. electrolytic solution.

The monomer preferably includes a mixture of a first monomer having at least two functional groups with an unsaturated bond represented by formulas 2, 3, or 4 at a terminal end and having a molecular weight of 50 to 100,000, or a mixture of the first monomer and a second monomer having at least one functional group represented by formulas 2, 3, or 4 and having a molecular weight of 50 to 100,000.

$$(R_1)(R_2)C=C(R_3)-C(=O)- \quad (2)$$

$$(R_1)(R_2)C=C(R_3)- \quad (3)$$

$$(R_1)(R_2)C=C(R_3)-CH_2- \quad (4)$$

where, $R_1$, $R_2$ and $R_3$ are the same or are independently selected from H, a $C_2$ to $C_{10}$ aliphatic or aromatic hydrocarbon, —C≡N, or —OR$_5$, where $R_5$ is H, $CH_3$, $C_2H_5$, —F, —Cl or —Br.

The monomer is preferably present in an amount from 0.01 to 20 wt % in the composition, and more preferably from 0.1 to 10 wt %. An amount of less than 0.01 wt % of the monomer causes an extreme swelling phenomenon, and an amount of more than 20 wt % causes deteriorated battery performance.

Examples of the monomer include poly(ethylene glycol) di(meth)acrylate, poly(propylene glycol)di(meth)acrylate, polyesterpolyol di(methacrylate), polycarbonatepolyol diacrylate, polycaprolactonediol di(meth)acrylate, trimethylolpropane ethoxylated tri(meth)acrylate, trimethylolpropane propooxylated tri(meth)acrylate, trimethylolpropane caprolactonated tri(meth)acrylate, tetramethylolpropane ethoxylated tri(meth)acrylate, tetramethylolpropane propooxylated tri(meth)acrylate, tetramethylolpropane caprolactonated tri(meth)acrylate, ditrimethylolpropane ethoxylated tri(meth)acrylate, ditrimethylolpropane propoxylated tri(meth)acrylate, ditrimethylolpropane caprolactonated tri(meth)acrylate, dipentaerythritol ethoxylated di(meth)acrylate, dipentaerythritol propoxylated di(meth)acrylate, dipentaerythritol caprolactonated di(meth)acrylate, glycerol ethoxylated di(meth)acrylate, glycerol propoxylated di(meth)acrylate, and dipentaerythritol caprolactonated hexacrylate. Alternatively, the monomer may be a monomer with vinyl group, allyl group or vinylsulfone group at a terminal site thereof, or urethane (meth)acrylate monomer.

The polymerization initiator may be one that can initiate polymerization of the monomer and does not cause deterioration of the battery performance. Exemplary are at least one selected from organic peroxides and azo-based compounds. The organic peroxides may be peroxydicarbonates such as di(4-t-butylcyclohexyl)peroxydicarbonate, di-2-ethylhexyl peroxy dicarbonate, di-isopropyl peroxydicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, or diethylene glycol-bis(t-butyl peroxy carbonate); diacyl peroxides such as diacetyl peroxide, dibenzoyl peroxide, dilauroyl peroxide, bis-3,5,5-trimethyl hexanoyl peroxide; or peroxy esters such as t-butyl peroxy pivalate, t-amyl peroxy pivalate, t-butyl peroxy-2-ethyl hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3-tetramethyl butyl 2-ethylhexanoate, t-amyl peroxy 2-ethyl hexanoate, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, or di-butylperoxy trimethyl adipate. The azo-based compound may be 2,2'-azo-bis(2,4-dimethylvaleronitrile) or 1,1'-azo-bis(cyanocyclo-hexane).

The polymerization initiator is present in an amount sufficient to initiate polymerization of the monomer, and is suitably present in an amount from 0.01 to 5 wt %.

A polymer electrolyte may be produced by using the polymer electrolyte composition as in the following various procedures. One method is that the polymer electrolyte composition is injected into a battery case such as a metal can or a pouch in which a positive electrode, a separator, and a negative electrode are placed, which is then heated at 40 to 100° C. for 30 minutes to 8 hours, thereby hardening (polymerizing) the polymer electrolyte composition to produce the polymer electrolyte. Another method is that the polymer electrolyte composition is coated on a positive or a negative electrode, and heat, ultraviolet rays, or electron beams are irradiated into the electrode to coat the polymer electrolyte on the surface of the positive or the negative electrode. The produced electrode is inserted into a battery case and sealed to fabricate a battery. A separator may be additionally used, or alternatively the polymer electrolyte also acts as the separator, so the separator may be not used.

A rechargeable lithium battery including the electrolyte of the present invention includes a positive electrode and a negative electrode.

The positive electrode includes a positive active material in which lithium intercalation reversibly occurs. Examples of positive active material are lithiated intercalation compounds and preferably a nickel-based lithiated intercalation compound because of its higher capacity. More preferably, in order to achieve high capacity and other battery performance improvements, a mixture of the nickel-based lithiated intercalation compound and a cobalt-based compound or manganese-based compound is used.

The swelling phenomenon especially occurs because of the nickel-based compound, so the effect of using the electrolyte of the present invention can be maximized when a nickel-based compound is used. The nickel-based compound may be one selected from the group consisting of compounds represented by formulas 6 and 7.

  $Li_xNi_yM_{1-y}A_2$ (6)

  $Li_xNi_yM_{1-y}O_{2-z}X_z$ (7)

where $0.90 \leq x \leq 1.1$, $0.1 \leq y \leq 0.9$, and $0 \leq z \leq 0.5$; M is at least one selected from Al, Ni, Co, Mn, Cr, Fe, Mg, Sr, V, and rare earth elements; A is selected from O, F, S, and P; and X is F, S, or P.

The cobalt-based or the manganese-based compound is any one used as an active material, and examples include those selected from the group consisting of compounds represented by formulas 8 to 12.

  $Li_xMn_{1-y}M_yA_2$ (8)

  $Li_xMn_{1-y}M_yO_{2-z}X_z$ (9)

  $Li_xMn_2O_{4-z}X_z$ (10)

  $Li_xCo_{1-y}M_yA_2$ (11)

  $Li_xCo_{1-y}M_yO_{2-z}X_z$ (12)

where $0.90 \leq x \leq 1.1$, $0 \leq y \leq 0.5$, $0 \leq z \leq 0.5$, and $0 \leq \alpha \leq 2$; M is at least one selected from the group consisting of Al, Ni, Co, Mn, Cr, Fe, Mg, Sr, V, and a earth elements; A is selected from O, F, S, and P, and X is F, S, or P.

The negative electrode includes a negative active material in which lithium intercalation reversibly occurs and examples are crystalline or amorphous carbon, or carbon composites.

The positive and the negative electrode are respectively produced by mixing the active material, a conductive agent, and a binder in a solvent to prepare an active material composition, and coating the composition on a current collector. The electrode preparation is well known in the related art, and is easily understood by one of ordinary skill in the art.

The conductive agent includes any conventional conductive agent used for an active material composition as long as it is chemically inert and has electrical conductivity. Examples thereof are one or a mixture selected from natural graphite, artificial graphite, carbon black, acetylene black, ketjen black; carbon fiber, and metal fibers such as copper, nickel, aluminum, and silver.

The binder includes any conventional binder used for an active material composition as long as it firmly adheres to the active material and the conductive agent on the current collector, and the binder may be styrene-butadiene rubber, polyvinyl alcohol, carboxymethylcellulose, hydroxylpropylenecellulose, diacetylenecellulose, polyvinylchloride, polyvinylpyrrolidone, polytetrafluoroethylene, polyvinylidene fluoride, polyethylene, or polypropylene. Most preferred are styrene-butadiene rubber compounds.

The solvent includes any conventional solvent used for an active material composition as long as it sufficiently distributes the active material, the conductive agent, and the binder. Examples of the solvent include be N-methyl pyrrolidone.

One embodiment of the lithium rechargeable battery according to the present invention is shown in FIG. 1. The rechargeable lithium battery 1 includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into a prismatic or pouch type battery as is well understood in the related art.

The positive electrode includes a positive active material in which lithium intercalation reversibly occurs. Examples of positive active materials are lithium transition metal oxides such as $LiCoO_2$, $LiNiO_2$, $LiMnO_2$, $LiMn_2O_4$, or $LiNi_{1-x-y}Co_xM_yO_2$ where $0 \leq x \leq 1$, $0 \leq y \leq 1$, $0 \leq x+y \leq 1$, and M is metal such as Al, Sr, Mg, or La.

The negative electrode includes a negative active material in which lithium intercalation reversibly occurs. Examples of negative active materials are crystalline or amorphous carbonaceous material, or carbon composites.

The positive active material and the negative active material are respectively coated on a current collector to produce electrodes, and the electrodes are wound together with or laminated on a separator to produce an electrode element. The electrode element is inserted into a battery case such as a can, and an electrolyte is injected into the case to fabricate a rechargeable lithium battery. The separator may be resin such as polyethylene or polypropylene.]

The following Examples further illustrate the present invention in detail, but are not to be construed to limit the scope thereof.

Example 1

1.5M $LiBF_4$ was dissolved in a mixed solvent of ethylene carbonate, γ-butyrolactone, and valeronitrile in the volume ratio of 3:6:1 to prepare an electrolyte.

Using the electrolyte, a $LiCoO_2$ positive electrode, and a graphite negative electrode, a rechargeable lithium cell was fabricated. The amount of the electrolyte was 2.2 g.

Example 2

1.5M $LiBF_4$ was dissolved in a mixed solvent of ethylene carbonate, γ-butyrolactone, and heptanenitrile in the volume ratio of 3:6:1 to prepare an electrolyte.

Using the electrolyte, a $LiCoO_2$ positive electrode, and a graphite negative electrode, a rechargeable lithium cell was fabricated. The amount of the electrolyte was 2.2 g.

Example 3

1.5M $LiBF_4$ was dissolved in a mixed solvent of ethylene carbonate, γ-butyrolactone, and capronitrile in the volume ratio of 3:6:1 to prepare an electrolyte.

Using the electrolyte, a $LiCoO_2$ positive electrode, and a graphite negative electrode, a rechargeable lithium cell was fabricated. The amount of the electrolyte was 2.2 g.

Example 4

1.15M $LiPF_6$ was dissolved in a mixed solvent of ethylene carbonate, γ-butyrolactone, and valeronitrile in the volume ratio of 3:6:1 to prepare an electrolyte.

Using the electrolyte, a $LiCoO_2$ positive electrode, and a graphite negative electrode, a rechargeable lithium cell was fabricated. The amount of the electrolyte was 2.2 g.

Example 5

1.15M $LiPF_6$ was dissolved in a mixed solvent of ethylene carbonate, γ-butyrolactone, and valeronitrile in the volume ratio of 3:5:2 to prepare an electrolyte.

Using the electrolyte, a $LiCoO_2$ positive electrode, and a graphite negative electrode, a rechargeable lithium cell was fabricated. The amount of the electrolyte was 2.2 g.

Example 6

1.15M $LiPF_6$ was dissolved in a mixed solvent of ethylene carbonate, γ-butyrolactone, and valeronitrile in the volume ratio of 3:5:2 to prepare an electrolyte.

Using the electrolyte, a $LiCoO_2$ positive electrode, and a graphite negative electrode, a rechargeable lithium cell was fabricated. The amount of the electrolyte was 2.2 g.

Example 7

1.15M $LiPF_6$ was dissolved in a mixed solvent of ethylene carbonate, γ-butyrolactone, and valeronitrile in the volume ratio of 3:5:2 to prepare an electrolyte.

Using the electrolyte, a $LiCoO_2$ positive electrode, and a graphite negative electrode, a rechargeable lithium cell was fabricated. The amount of the electrolyte was 2.2 g.

Example 8

1.15M $LiPF_6$ was dissolved in a mixed solvent of ethylene carbonate, ethylmethyl carbonate, and valeronitrile in the volume ratio of 3:6:1 to prepare an electrolyte.

Using the electrolyte, a $LiCoO_2$ positive electrode, and a graphite negative electrode, a rechargeable lithium cell was fabricated. The amount of the electrolyte was 2.2 g.

Example 9

1.15M $LiPF_6$ was dissolved in a mixed solvent of ethylene carbonate, dimethyl carbonate, and valeronitrile in the volume ratio of 3:5:2 to prepare an electrolyte.

Using the electrolyte, a $LiCoO_2$ positive electrode, and a graphite negative electrode, a rechargeable lithium cell was fabricated. The amount of the electrolyte was 2.2 g.

Example 10

1.15M LiPF$_6$ was dissolved in a mixed solvent of ethylene carbonate, diethyl carbonate, and valeronitrile in the volume ratio of 3:6:1 to prepare an electrolyte.

Using the electrolyte, a LiCoO$_2$ positive electrode, and a graphite negative electrode, a rechargeable lithium cell was fabricated. The amount of the electrolyte was 2.2 g.

Example 11

A rechargeable lithium cell was fabricated by the same procedure as in Example 1, except that a positive active material was produced by mixing LiNi$_{0.8}$Co$_{0.1}$Mn$_{0.1}$O$_2$ with LiCoO$_2$ at a weight ratio of 8:2, and the amount of the electrolyte was 2.1 g.

Example 12

A rechargeable lithium cell was fabricated by the same procedure as in Example 2, except that a positive active material was produced by mixing LiNi$_{0.8}$Co$_{0.1}$Mn$_{0.1}$O$_2$ with LiCoO$_2$ at a weight ratio of 8:2, and the amount of the electrolyte was 2.1 g.

Example 13

A rechargeable lithium cell was fabricated by the same procedure as in Example 3, except that a positive active material was produced by mixing LiNi$_{0.8}$Co$_{0.1}$Mn$_{0.1}$O$_2$ with LiCoO$_2$ at a weight ratio of 8:2, and the amount of the electrolyte was 2.1 g.

Example 14

A rechargeable lithium cell was fabricated by the same procedure as in Example 4, except that a positive active material was produced by mixing LiNi$_{0.8}$Co$_{0.1}$Mn$_{0.1}$O$_2$ with LiCoO$_2$ at a weight ratio of 8:2, and the amount of the electrolyte was 2.1 g.

Example 15

A rechargeable lithium cell was fabricated by the same procedure as in Example 5, except that a positive active material was produced by mixing LiNi$_{0.8}$Co$_{0.1}$Mn$_{0.1}$O$_2$ with LiCoO$_2$ at a weight ratio of 8:2, and the amount of the electrolyte was 2.1 g.

Example 16

A rechargeable lithium cell was fabricated by the same procedure as in Example 6 except that a positive active material was produced by mixing LiNi$_{0.8}$Co$_{0.1}$Mn$_{0.1}$O$_2$ with LiCoO$_2$ at a weight ratio of 8:2, and the amount of the electrolyte was 2.1 g.

Example 17

A rechargeable lithium cell was fabricated by the same procedure as in Example 11, except that an electrolyte was prepared by dissolving 1.15M LiPF$_6$ in a mixed solvent of ethylene carbonate, diethyl carbonate, and valeronitrile at a volume ratio of 3:5:2.

Example 18

A rechargeable lithium cell was fabricated by the same procedure as in Example 11, except that an electrolyte was prepared by dissolving 1.15M LiPF$_6$ in a mixed solvent of ethylene carbonate, diethyl carbonate and valeronitrile at a volume ratio of 30:55:15.

Example 19

A rechargeable lithium cell was fabricated by the same procedure as in Example 1, except that a mixed lithium salt of LiPF$_6$ and LiBF$_4$ at a weight ratio of 99.9:0.1 was used.

Example 20

A rechargeable lithium cell was fabricated by the same procedure as in Example 7, except that a mixed lithium salt of LiPF$_6$ and LiBF$_4$ at a weight ratio of 99.9:0.1 was used.

Comparative Example 1

A rechargeable lithium cell was fabricated by the same procedure as in Example 1, except that an electrolyte was prepared by dissolving 1.15M LiPF$_6$ in a mixed solvent of ethylene carbonate, ethylmethyl carbonate, propylene carbonate, and fluorobenzene at a volume ratio of 30:55:15.

Comparative Example 2

A rechargeable lithium cell was fabricated by the same procedure as in Example 1, except that an electrolyte was prepared by dissolving 1.15M LiPF$_6$ in a mixed solvent of ethylene carbonate, ethylmethyl carbonate, and fluorobenzene at a volume ratio of 30:55:15.

Comparative Example 3

A rechargeable lithium cell was fabricated by the same procedure as in Example 11, except that an electrolyte was prepared by dissolving 1.5M LiBF$_4$ in a mixed solvent of ethylene carbonate, γ-butyrolactone, and diethyl carbonate at a volume ratio of 4:4:2.

Comparative Example 4

A rechargeable lithium cell was fabricated by the same procedure as in Example 11, except that an electrolyte was prepared by dissolving 1.5M LiBF$_4$ in a mixed solvent of ethylene carbonate, γ-butyrolactone, and fluorobenzene at a volume ratio of 30:55:15.

Comparative Example 5

A rechargeable lithium cell was fabricated by the same procedure as in Example 11, except that an electrolyte was prepared by dissolving 1.15M LiPF$_6$ in a mixed solvent of ethylene carbonate, ethylmethyl carbonate, propylene carbonate, and fluorobenzene at a volume ratio of 30:55:5:10.

Comparative Example 6

A rechargeable lithium cell was fabricated by the same procedure as in Example 11, except that an electrolyte was prepared by dissolving 1.15M $LiPF_6$ in a mixed solvent of ethylene carbonate, ethylmethyl carbonate, and fluorobenzene at a volume ratio of 3:6:1.

Comparative Example 7

A rechargeable lithium cell was fabricated by the same procedure as in Example 11, except that an electrolyte was prepared by dissolving 1.5M $LiBF_4$ in a mixed solvent of ethylene carbonate, γ-butyrolactone, and diethyl carbonate at a volume ratio of 4:4:2.

Comparative Example 8

A rechargeable lithium cell was fabricated by the same procedure as in Example 11, except that an electrolyte was prepared by dissolving 1.5M $LiBF_4$ in a mixed solvent of ethylene carbonate, γ-butyrolactone, fluorobenzene, and diethyl carbonate at a volume ratio of 3:5:1:1.

Comparative Example 9

A rechargeable lithium cell was fabricated by the same procedure as in Example 11, except that an electrolyte was prepared by dissolving 1.3M $LiPF_6$ in a mixed solvent of ethylene carbonate, ethylmethyl carbonate, propylene carbonate, and fluorobenzene at a volume ratio of 30:55:5:15.

Comparative Example 10

A rechargeable lithium cell was fabricated by the same procedure as in Example 11, except that an electrolyte was prepared by dissolving 1.3M $LiPF_6$ in a mixed solvent of ethylene carbonate, and ethylmethyl carbonate at a volume ratio of 3:7.

The lithium cells according to Examples 1 to 12 and Comparative Examples 1 to 8 were constant-current and constant-voltage charged at a 0.5 C rate and a cut-off voltage of 4.2V and 20 mAh, and the charged cells were allowed to stand in an oven of 85° C. for 4 hours. Thereafter, the thicknesses of the cells were measured. The increases in the thickness in comparison to the initial charged cells are shown in Table 1.

TABLE 1

|  | Increase in thickness (%) |
| --- | --- |
| Example 1 | 1.1 |
| Example 2 | 1.6 |
| Example 3 | 1.1 |
| Comparative Example 7 | 7.2 |
| Comparative Example 8 | 6.2 |
| Example 4 | 7 |
| Example 5 | 6 |
| Example 6 | 6 |
| Example 7 | 7 |
| Example 8 | 9 |
| Example 9 | 1.5 |
| Example 10 | 2.3 |
| Comparative Example 5 | 95.1 |
| Comparative Example 6 | 120 |

TABLE 1-continued

|  | Increase in thickness (%) |
| --- | --- |
| Example 11 | 4.9 |
| Example 12 | 5.6 |
| Example 13 | 5.5 |
| Comparative Example 3 | 3.5 |
| Comparative Example 4 | 3.8 |
| Example 14 | 12.7 |
| Example 15 | 10.4 |
| Example 16 | 10.0 |
| Example 19 | 1.1 |
| Example 20 | 3.5 |
| Example 17 | 20 |
| Example 18 | 30 |
| Comparative Example 9 | 120 |
| Comparative Example 10 | 86 |
| Comparative Example 1 | 30 |
| Comparative Example 2 | 33 |

It is evident from Table 1 that the increase in thickness of the cells according to Examples 1 to 20 was reduced compared to those of the cells according to Comparative Example 1 to 10. These results indicate that swelling was suppressed in the cells according to Examples 1 to 20 compared with Comparative Examples 1 to 10. In particular, the increases in thickness of the cells according to Examples 4 and 5 were substantially reduced in comparison to Comparative Example 1 and 2, even though the cells according to Examples 4 and 5 and Comparative Examples 1 and 2 included ethylene carbonate and ethylmethyl carbonate.

Figure 2:
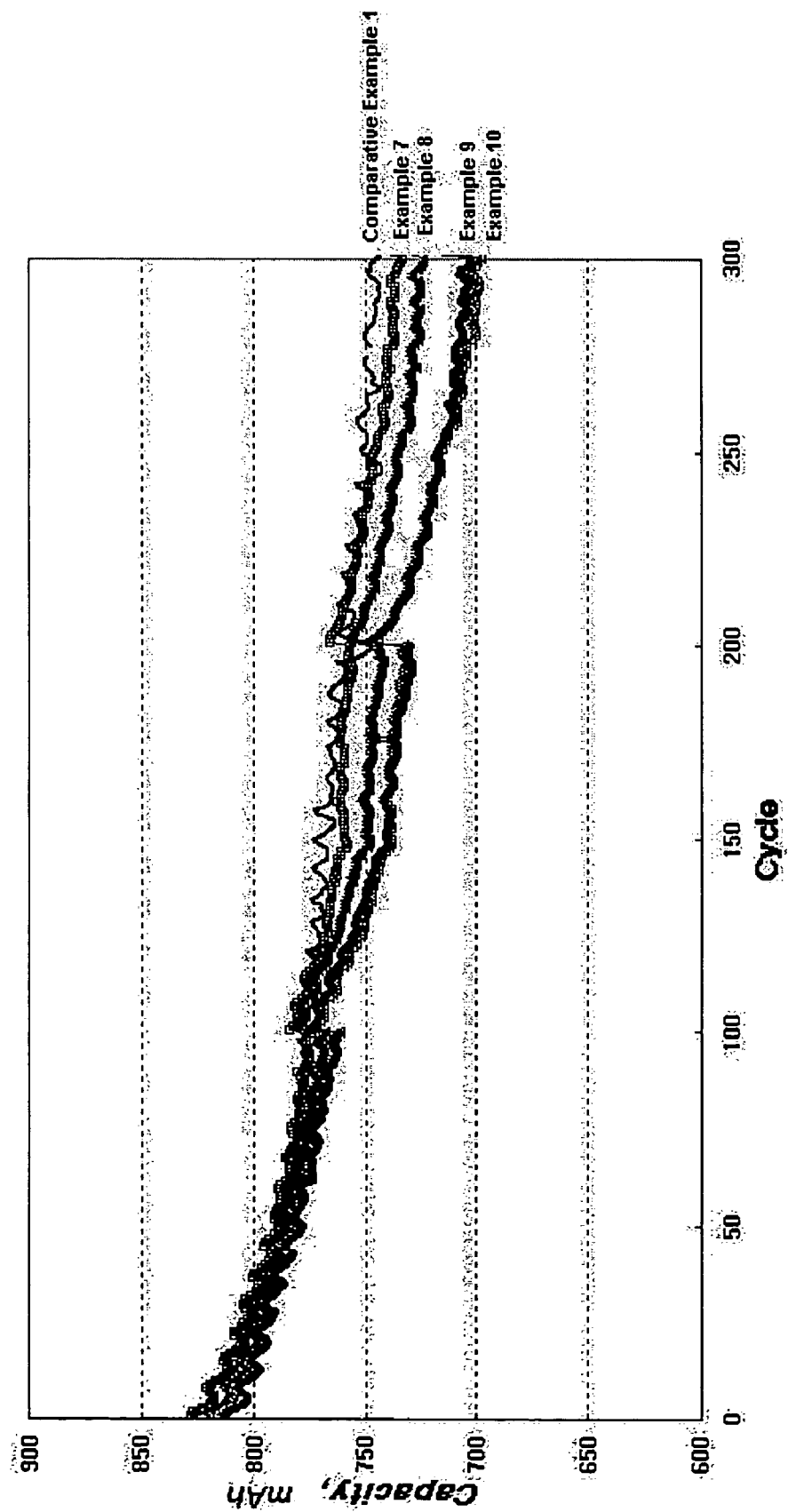
FIG. 2 is a graph illustrating cycle life characteristics of the cells according to Examples 7 to 10 of the present invention and Comparative Example 1.

The cells according to Examples 7 to 10 and Comparative Example 1 were charged under constant current and constant voltage at a 1 C rate and a cut-off voltage of 4.2V and 0.1 C (82 mAh), and discharged at constant current to a cut-off voltage of 3V. The cycle life characteristics were measured and the results are shown in FIG. 2. As shown in FIG. 2, the cells according to Examples 7 to 10 exhibited cycle life characteristics corresponding to that of Comparative Example 1. Thus, the electrolyte of the present invention can effectively improve storage characteristics and suppress swell at high temperatures without deterioration of battery performance in areas such as in capacity, high-rate, low-temperature, and cycle life characteristics.

Example 21

1.5 wt % of a Dipentaerythritol caprolactonated hexaacrylate monomer (Nippon Kayaku) and di(4-t-butylcyalohexyl peroxydicarbonate) ("Perkadox 16", AKZO NOBEL) were added to 98.5 wt % of an electrolytic solution of 1.3M $LiPF_6$ in ethylene carbonate, diethyl carbonate, and valeronitrile (3:5:2 volume ratio) and then mixed for 10 minutes to prepare a composition for preparing a polymer electrolyte. At this time, the amount of the initiator was 5 wt % based on the amount of the monomer.

The positive electrode included a mixed positive active material of $LiNi_{0.8}Co_{0.1}Mn_{0.1}O_2$ and $LiCoO_2$ at a weight ratio of 6:4, a carbon black conduct agent, and a polyvinylidene fluoride binder and the negative electrode included a natural graphite negative active material and a styrene-butadiene rubber binder. The positive electrode, the negative electrode and a separator were wound to produce a jelly-roll, and the jelly-roll was inserted in to an Al pouch case and partially sealed. The composition was injected into the case and it was completely sealed. The amount of the composition was 2.62 g. The sealed case was allowed to stand at 70° C. for 4 hours to fabricate a rechargeable lithium cell with a gel polymer electrolyte.

Example 22

A rechargeable lithium cell was fabricated by the same procedure as in Example 21, except that heptane nitrile was used instead of valeronitrile.

Example 23

A rechargeable lithium cell was fabricated by the same procedure as in Example 21, except that caprilonitrile was used instead of valeronitrile.

Example 24

A rechargeable lithium cell was fabricated by the same procedure as in Example 21, except that cyclohexane carbonitrile was used instead of valeronitrile.

Example 25

A rechargeable lithium cell was fabricated by the same procedure as in Example 21, except that 2-fluorobenzonitrilee was used instead of valeronitrile.

Example 26

A rechargeable lithium cell was fabricated by the same procedure as in Example 21 except that a mixed solution of 1.3M $LiPF_6$ in ethylene carbonate, diethyl carbonate, and valeronitrile at a volume ratio of 30:65:5 was used as an electrolytic solution.

Example 27

A rechargeable lithium cell was fabricated by the same procedure as in Example 21, except that a mixed solution of 1.3M $LiPF_6$ in ethylene carbonate, diethyl carbonate, and valeronitrile at a volume ratio of 30:40:30 was used as an electrolytic solution.

Example 28

A rechargeable lithium cell was fabricated by the same procedure as in Example 21, except that a mixed solution of 1.3M $LiPF_6$ in ethylene carbonate, diethyl carbonate, and valeronitrile at a volume ratio of 30:55:15 was used as an electrolytic solution.

Example 29

A rechargeable lithium cell was fabricated by the same procedure as in Example 21, except that a mixed solution of 1.3M $LiPF_6$ in ethylene carbonate, diethyl carbonate, and valeronitrile at a volume ratio of 30:45:25 was used as an electrolytic solution.

Example 30

A rechargeable lithium cell was fabricated by the same procedure as in Example 21, except that a mixed solution of 1.3M $LiPF_6$ in ethylene carbonate, diethyl carbonate, and valeronitrile at a volume ratio of 15:65:20 was used as an electrolytic solution.

Example 31

A rechargeable lithium cell was fabricated by the same procedure as in Example 21, except that a mixed solution of 1.3M $LiPF_6$ in ethylene carbonate, γ-butyrolactone, and valeronitrile at a volume ratio of 30:50:20 was used as an electrolytic solution.

Example 32

A rechargeable lithium cell was fabricated by the same procedure as in Example 21, except that a mixed solution of 1.3M $LiPF_6$ in ethylene carbonate, γ-butyrolactone, and valeronitrile at a volume ratio of 15:65:20 was used as an electrolytic solution.

Example 33

A rechargeable lithium cell was fabricated by the same procedure as in Example 21, except that fluoroethylene carbonate was added to the electrolytic solution in an amount of 3% based on the electrolytic solution.

Example 34

A rechargeable lithium cell was fabricated by the same procedure as in Example 21, except that a mixed solution of 1.3M $LiPF_6$ in ethylene carbonate, γ-butyrolactone, diethyl carbonate, and valeronitrile at a volume ratio of 15:40:30:15 was used as an electrolytic solution.

Comparative Example 10

A rechargeable lithium cell was fabricated by the same procedure as in Example 21, except that a mixed solution of 1.3M $LiPF_6$ in ethylene carbonate, ethylmethyl carbonate, propylene carbonate, and fluorobenzene at a volume ratio of 30:55:5:10 was used as an electrolytic solution.

Comparative Example 11

A rechargeable lithium cell was fabricated by the same procedure as in Example 21, except that poly(ethylene glycol)dimethacrylate was used as a compound for forming a polymer.

Comparative Example 12

A rechargeable lithium cell was fabricated by the same procedure as in Example 21, except that a mixed solution of 1.3M $LiPF_6$ in acetonitrile and ethylene carbonate at a volume ratio of 7:3 was used as an electrolytic solution.

Comparative Example 13

A rechargeable lithium cell was fabricated by the same procedure as in Example 21, except that a mixed solution of 1.3M $LiPF_6$ in acetonitrile and ethylene carbonate at a volume ratio of 1:1 was used as an electrolytic solution.

Comparative Example 14

A rechargeable lithium cell was fabricated by the same procedure as in Example 21, except that a mixed solution of 1.3 $LiPF_6$ in acetonitrile, ethylene carbonate, and diethyl carbonate at a volume ratio of 40:30:30 was used as an electrolytic solution.

Example 35

A rechargeable lithium cell was fabricated by the same procedure as in Example 21, except that a mixed positive active material of $LiNi_{0.8}Co_{0.15}Mn_{0.05}O_2$ and $LiCoO_2$ was used as a positive active material.

Example 36

A rechargeable lithium cell was fabricated by the same procedure as in Example 21 except that a mixed positive active material of $LiNi_{0.75}Co_{0.2}Mn_{0.05}O_2$ and $LiCoO_2$ was used as a positive active material.

Capacity Test

The cells according to Examples 21 to 36 and Comparative Examples 10 to 14 were constant-current and constant-voltage charged at 0.5 C to 4.2V and a cut-off time of 3 hours, and constant-current discharged at 0.2 C and a cut-off voltage of 2.75V. The capacity was measured and the results are presented in Table 2.

Swelling Characteristics

The cells according to Examples 21 to 36 and Comparative Examples 10 to 16 were constant-current charge and constant-voltage charged at 0.5 C to 4.2V and a cut-off condition of 0.1 C. The charged cells were allowed to stand at 85° C. in a hot-wind oven for 4 hours, and the thicknesses thereof were measured. The increase in thickness compared to the initial charged cell for each was measured and the results are presented in Table 2.

Cycle Life Characteristics

The cells according to Examples 21 to 36 and Comparative Examples 10 to 14 were charged 500 times at 1 C, and the cycle life characteristics (retention capacity %) were measured. The results are shown in Table 2.

TABLE 2

| | Capacity (mAh) | Cycle life (retention capacity % for 500 times) | Increase in thickness (%) |
|---|---|---|---|
| Example 21 | 920 | 90 | 1.5 |
| Example 22 | 918 | 88 | 2.0 |
| Example 23 | 921 | 88 | 1.8 |
| Example 24 | 920 | 89 | 2.1 |
| Example 25 | 920 | 87 | 2.3 |
| Example 26 | 921 | 92 | 3.5 |
| Example 27 | 918 | 80 | 1.0 |
| Example 28 | 919 | 89 | 1.5 |
| Example 29 | 917 | 85 | 1.0 |
| Example 30 | 921 | 88 | 2.3 |
| Example 31 | 918 | 88 | 1.9 |
| Example 32 | 920 | 85 | 2.0 |
| Example 33 | 919 | 92 | 3.5 |
| Example 34 | 919 | 87 | 1.8 |
| Example 35 | 920 | 89 | 1.7 |
| Example 36 | 916 | 90 | 3.4 |
| Comparative Example 10 | 922 | 92 | 44.9 |
| Comparative Example 11 | 890 | 60 | 12 |
| Comparative Example 12 | 900 | 80 | 23 |
| Comparative Example 13 | 911 | 74 | 32 |
| Comparative Example 14 | 917 | 82 | 19 |

As shown in Table 2, the cells according to Examples 21 to 36 exhibited corresponding capacities to those according to Comparative Examples 10 to 14, but exhibited good cycle life characteristics, and excellent swelling inhibition. Hence, the cells according to Examples 21 to 35 exhibit improved safety while the capacity and the cycle life characteristics are maintained.

Example 37

1.15M $LiPF_6$ was dissolved in a mixed solution of ethylene carbonate, diethyl carbonate and valeronitrile at a volume ratio of 30:50:20 to prepare an electrolyte.

The positive electrode included a mixed positive active material of $LiNi_{0.8}Co_{0.1}Mn_{0.1}O_2$ and $LiCoO_2$ at a weight ratio of 6:4, a carbon black conductive agent, and a polyvinylidene fluoride binder, and the negative electrode included a natural graphite negative active material and a styrene-butadiene rubber binder. Using the positive electrode, the negative electrode, and the electrolyte, a lithium cell was fabricated.

Example 38

A lithium cell was fabricated by the same procedure as in Example 37, except that heptane nitrile was used instead of valeronitrile.

Example 39

A lithium cell was fabricated by the same procedure as in Example 37, except that caprilonitrile was used instead of valeronitrile.

Example 40

A lithium cell was fabricated by the same procedure as in Example 37, except that cyclohexane carbonitrile was used instead of valeronitrile.

Example 41

A lithium cell was fabricated by the same procedure as in Example 37, except that 2-fluorobenzonitirlee was used instead of valeronitrile.

Example 42

A lithium cell was fabricated by the same procedure as in Example 37, except that 1.15M $LiPF_6$ was dissolved in a mixed solution of ethylene carbonate, diethyl carbonate, and valeronitrile at a volume ratio of 30:40:30 to prepare an electrolyte.

Example 43

A lithium cell was fabricated by the same procedure as in Example 37, except that 1.15M $LiPF_6$ was dissolved in a mixed solution of ethylene carbonate, diethyl carbonate, and valeronitrile at a volume ratio of 30:55:15 to prepare an electrolyte.

Example 44

A lithium cell was fabricated by the same procedure as in Example 37, except that 1.15M $LiPF_6$ was dissolved in a mixed solution of ethylene carbonate, diethyl carbonate, and valeronitrile at a volume ratio of 30:45:25 to prepare an electrolyte.

Comparative Example 15

A lithium cell was fabricated by the same procedure as in Example 37, except that 1.15M $LiPF_6$ was dissolved in a mixed solution of ethylene carbonate, ethylmethyl carbonate, propylene carbonate, and fluorobenzene at a volume ratio of 30:55:10 to prepare an electrolyte.

Comparative Example 16

A lithium cell was fabricated by the same procedure as in Example 37, except that 1.15M $LiPF_6$ was dissolved in a mixed solution of acetonitrile and ethylene carbonate at a volume ratio of 7:3 to prepare an electrolyte.

Comparative Example 17

A lithium cell was fabricated by the same procedure as in Example 37, except that 1.15M LiPF$_6$ was dissolved in a mixed solution of acetonitrile and ethylene carbonate at a volume ratio of 1:1 to prepare an electrolyte.

Comparative Example 18

A lithium cell was fabricated by the same procedure as in Example 37, except that 1.15M LiPF$_6$ was dissolved in a mixed solution of acetonitrile, ethylene carbonate, and diethyl carbonate at a volume ratio of 40:30:30 to prepare an electrolyte.

Capacity, cycle life characteristics and swelling characteristics tests were performed on the cells according to Examples 37 to 44 and Comparative Examples 16 to 19. The results are presented in Table 3.

TABLE 3

| | Capacity (mAh) | Cycle life (retention capacity % for 500 times) | Increases in thickness (%) |
|---|---|---|---|
| Example 37 | 923 | 89 | 15.4 |
| Example 38 | 921 | 88 | 16.2 |
| Example 39 | 922 | 88 | 14.9 |
| Example 40 | 921 | 87 | 14.5 |
| Example 41 | 923 | 90 | 17.6 |
| Example 42 | 919 | 83 | 12.1 |
| Example 43 | 924 | 89 | 15.0 |
| Example 44 | 920 | 85 | 12.2 |
| Comparative Example 16 | 925 | 92 | 105 |
| Comparative Example 17 | 900 | 80 | 26 |
| Comparative Example 18 | 910 | 83 | 30.1 |
| Comparative Example 19 | 920 | 88 | 27.5 |

Example 45

1 wt % of a Dipentaerythritol caprolactonated hexacrylate derivative monomer (Nippon Kayaku) and a di(4-t-butylcyalohexyl peroxydicarbonate ("Perkadox 16", AKZO NOBEL) were added to 98.5 wt % of an electrolytic solution of 1.3M LiPF$_6$ in ethylene carbonate, γ-butyrolactone, diethyl carbonate, and valeronitrile (15:55:20:10 volume ratio) and then mixed for 10 minutes to prepare a composition for preparing a polymer electrolyte. At this time, the amount of the initiator was 3 wt % based on the amount of the monomer.

The positive electrode included a LiCoO$_2$ positive active material, a carbon black conductive agent, and a polyvinylidene fluoride binder, and the negative electrode included a natural graphite negative active material and a styrene-butadiene rubber binder. The positive electrode, the negative electrode, and a separator were wound to produce a jelly-roll, and the jelly-roll was inserted in to an Al pouch case and partially sealed. The composition was injected into the case and was completely sealed. The amount of the composition was 2.62 g. The sealed case was allowed to stand at 70° C. for 4 hours to fabricate a rechargeable lithium cell with a gel polymer electrolyte.

Overdischarge Test

The capacity recovery step was performed on the cell according to Example 45. The capacity recovery step included a first step including charging at 500 mA to 4.2V under a cut-off condition of 50 mA, a first discharging at 300 mA and a cut-off voltage of 3.00V, a second discharging at 2 mA and a cut-off voltage of 2.75V, and a third discharging at 1 mA, and a cut-off voltage of 0.00V, and allowing to stand for 60 minutes; and then a second step including a first charging at 500 mA and a cut-off voltage of 3V, a second charging at 500 mA and 4.2V under a cut-off condition of 50 mA, and then discharging at 300 mA to a cut-off voltage of 3V.

The capacity recovery step was referred to as 1 cycle, and it was repeated three times. The initial capacity and the discharge capacity for each cycle were measured and then the recovery capacity percentage was obtained from the capacity after each cycle with respect to the initial capacity. The initial capacity was a capacity after the cell was charged at 500 mA and 4.2V under a cut-off condition of 50 mA, and first discharged at 300 mA under a cut-off voltage of 3.0V. The measured initial capacity was 895 mAh. When the initial capacity of 895 mAh was 100%, a capacity at 1 cycle was 834 mAh, that is, 97%, at 2 cycles, 832 mAh, 97%, and at 3 cycles, 839 mAh, 98%. These results indicate good capacity recovery.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a rechargeable lithium battery comprising:
   a lithium salt;
   a non-aqueous organic solvent comprising 70 to 95 volume % of an ester-based solvent comprising a cyclic ester; and 5 to 30 volume % of a nitrile-based solvent represented by the formula:

R—C≡N where R is selected from the group consisting of $C_1$ to $C_{10}$ aliphatic hydrocarbons, $C_1$ to $C_{10}$ halogenated aliphatic hydrocarbons, $C_6$ to $C_{10}$ aromatic hydrocarbons, and $C_6$ to $C_{10}$ halogenated aromatic hydrocarbons.

2. The electrolyte of claim 1, wherein the non-aqueous organic solvent includes 75 to 90 volume % of the ester-based solvent comprising the cyclic ester and 10 to 25 volume % of the nitrile-based solvent.

3. The electrolyte of claim 1, wherein the cyclic ester includes 10 to 40 volume % of ethylene carbonate, and 30 to 85 volume % of a solvent selected from the group consisting of propylene carbonate, butylene carbonate, γ-butyrolactone, γ-valerolactone, γ-caprolactone, δ-valerolactone, ∈-caprolactone, and mixtures thereof, and wherein the cyclic ester is present in an amount from 70 to 95 volume %.

4. The electrolyte of claim 1, wherein the cyclic ester includes 10 to 15 volume % of ethylene carbonate, and 55 to 85 volume % of a solvent selected from the group consisting of propylene carbonate, butylene carbonate, γ-butyrolactone, γ-valerolactone, γ-caprolactone, δ-valerolactone, ∈-caprolactone, and mixtures thereof, and wherein the cyclic ester is present in an amount from 70 to 95 volume %.

5. The electrolyte of claim 1, wherein R is selected from the group consisting of $C_3$ to $C_8$ aliphatic hydrocarbons and $C_3$ to $C_8$ halogenated aliphatic hydrocarbons.

6. The electrolyte of claim 1, wherein the nitrile-based solvent is selected from the group consisting of acetonitrile, propionitrile, butyronitrile, t-butyl cyanide, valeronitrile, caprylonitrile, heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, and 4-fluorophenylacetonitrile.

7. The electrolyte of claim 1, wherein the organic solvent further comprises a linear ester in an amount up to 70 parts by volume based on 100 parts by volume of the total cyclic ester and the nitrile-based solvent.

8. The electrolyte of claim 7, wherein the linear ester is selected from the group consisting of dimethyl carbonate, ethylmethyl carbonate, diethyl carbonate, dipropyl carbonate, dibutyl carbonate, methyl acetate, ethyl acetate, methyl hexanoate, methyl formate, and mixtures thereof.

9. The electrolyte of claim 1, wherein the electrolyte includes a monomer and a polymerization initiator.

10. The electrolyte of claim 9, wherein the monomer is a first monomer, wherein the electrolyte further includes a second monomer, wherein:
the first monomer has at least two functional groups at a terminal end thereof, one functional group being selected from the group consisting of unsaturated groups represented by formulas 2 to 4, and the first monomer has a molecular weight from 50 to 100,000; and
the second monomer has one functional group selected from the group consisting of an unsaturated bond represented by formulas 2 to 4, and the second monomer has a molecular weight from 50 to 100,000;

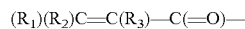  (2)

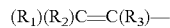  (3)

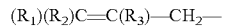  (4)

where $R_1$, $R_2$ and $R_3$ are the same or are independently selected from the group consisting of H, $C_2$ to $C_{10}$ aliphatic or aromatic hydrocarbons, —C≡N, and —$OR_5$, where $R_5$ is selected from the group consisting of H, $CH_3$, $C_2H_5$, —F, —Cl, and Br.

11. The electrolyte of claim 9, wherein the polymer electrolyte includes from 0.01 to 20 wt % of monomer.

12. The electrolyte of claim 9, wherein the polymerization initiator is an organic peroxide or an azo-based compound.

13. The electrolyte of claim 12, wherein the polymerization initiator is selected from the group consisting of peroxy dicarbonates selected from the group consisting of di(4-t-butylcyclohexyl)peroxydicarbonate, di-2-ethylhexyl peroxy dicarbonate, di-isopropyl peroxydicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, and diethylene glycol-bis(t-butyl peroxy carbonate); diacyl peroxides selected from the group consisting of diacetyl peroxide, dibenzoyl peroxide, dilauroyl peroxide, and bis-3,5,5-trimethyl hexanoyl peroxide; and peroxy esters selected from the group consisting of t-butyl peroxypivalate, t-amyl peroxy pivalate, t-butyl peroxy-2-ethyl hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecanoate, 1,1,3,3-tetramethyl butyl 2-ethylhexanoate, t-amylperoxy 2-ethyl hexanoate, t-butyl peroxy isobutyrate, t-amylperoxy 3,5,5-trimethyl hexanoyl, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate; and azo-based compounds selected from the group consisting of 2,2'-azo-bis(2,4-dimethylvaleronitrile) and 1,1'-azo-bis(cyanocyclo-hexane).

14. The electrolyte of claim 1, wherein the lithium salt is selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)$ $(C_yF_{2y+1}SO_2)$ where x and y are natural numbers, $LiSO_3CF_3$, and mixtures thereof.

15. The electrolyte of claim 1, wherein the electrolyte further comprises an additive selected from the group consisting of a substituted carbonate with a substitution group, vinylene carbonate, divinyl sulfone, ethylene sulfite, and mixtures thereof, wherein the substitution group is selected from the group consisting of halogens, a cyano (CN) and a nitro ($NO_2$).

16. The electrolyte of claim 15, wherein the additive is a substituted carbonate with a substitution group selected from the group consisting of halogens, a cyano (CN) and a nitro ($NO_2$).

17. The electrolyte of claim 16, wherein the substituted carbonate is represented by the formula:

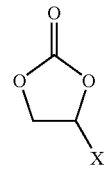

where X is selected from the group consisting of halogens, cyano (CN) and nitro ($NO_2$).

18. The electrolyte of claim 17, wherein the substituted carbonate is fluoroethylene carbonate.

19. The electrolyte of claim 16, wherein the additive is present in an amount between 0.01 and 10 parts by weight based on 100 parts by weight of the total electrolyte.

20. A rechargeable lithium battery comprising:
a positive electrode comprising a positive active material in which lithium intercalation reversibly occurs;
a negative electrode comprising a negative active material in which lithium intercalation reversibly occurs;
an electrolyte comprising an organic solvent and a lithium salt, the organic solvent comprising 70 to 95 volume % of an ester-based solvent comprising a cyclic ester and 5 to 30 volume % of a nitrile-based solvent represented by the formula:

where R is selected from the group consisting of $C_1$ to $C_{10}$ aliphatic hydrocarbons, $C_1$ to $C_{10}$ halogenated aliphatic hydrocarbons, $C_6$ to $C_{10}$ aromatic hydrocarbons, and $C_6$ to $C_{10}$ halogenated aliphatic hydrocarbons.

21. The rechargeable lithium battery of claim 20, wherein the non-aqueous organic solvent includes 75 to 90 volume % of the ester-based solvent comprising the cyclic ester and 10 to 25 volume % of the nitrile-based solvent.

22. The rechargeable lithium battery of claim 20, wherein the cyclic ester includes 10 to 40 volume % of ethylene carbonate, and 30 to 85 volume % of a solvent selected from the group consisting of propylene carbonate, butylene carbonate, γ-butyrolactone, γ-valerolactone, γ-caprolactone, δ-valerolactone, and ∈-caprolactone, and wherein the cyclic ester is present in an amount from 70 to 95 volume %.

23. The rechargeable lithium battery of claim 20, wherein the cyclic ester includes 10 to 15 volume % of ethylene carbonate, and 55 to 85 volume % of a solvent selected from the group consisting of propylene carbonate, butylene carbonate, γ-butyrolactone, γ-valerolactone, γ-caprolactone, δ-valerolactone, ∈-caprolactone, and mixtures thereof, and wherein the cyclic ester is present in an amount from 70 to 95 volume %.

24. The rechargeable lithium battery of claim 20, wherein R is selected from the group consisting of $C_3$ to $C_8$ aliphatic hydrocarbons and $C_3$ to $C_8$ halogenated aliphatic hydrocarbons.

25. The rechargeable lithium battery of claim 20, wherein the nitrile-based solvent is selected from the group consisting of acetonitrile, propionitrile, butyronitrile, t-butyl cyanide, valeronitrile, caprylonitrile, heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, 4-fluorophenylacetonitrile and mixtures thereof.

26. The rechargeable lithium battery of claim 20, wherein the organic solvent further comprises a linear ester in an amount up to 70 parts by volume based on 100 parts by volume of the total cyclic ester and the nitrile-based solvent.

27. The rechargeable lithium battery of claim 20, wherein the electrolyte further includes a monomer and a polymerization initiator.

28. The rechargeable lithium battery of claim 27, wherein the monomer is a first monomer, wherein the electrolyte further includes a second monomer, wherein:

the first monomer has at least two functional groups at a terminal end thereof, one functional group being selected from the group consisting of unsaturated groups represented by formulas 2 to 4, and the first monomer has a molecular weight from 100 to 10,000; and the second monomer has one functional group selected from the group consisting of unsaturated bonds represented by formulas 2 to 4, and the second monomer has a molecular weight from 100 to 10,000:

   (2)

   (3)

   (4)

where, $R_1$, $R_2$ and $R_3$ are the same or are independently selected from the group consisting of H, $C_2$ to $C_{10}$ aliphatic or aromatic hydrocarbons, —C≡N, and —$OR_5$, where $R_5$ is selected from the group consisting of H, $CH_3$, $C_2H_5$, —F, —Cl and Br.

29. The rechargeable lithium battery of claim 27, wherein the polymerization initiator is an organic peroxide or an azo-based compound.

30. The rechargeable lithium battery of claim 29, wherein the polymerization initiator is selected from the group consisting of peroxy dicarbonates selected from the group consisting of di(4-t-butylcyclohexyl)peroxydicarbonate, di-2-ethylhexyl peroxy dicarbonate, di-isopropyl peroxydicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, and diethylene glycol-bis(t-butyl peroxy carbonate); diacyl peroxides selected from the group consisting of diacetyl peroxide, dibenzoyl peroxide, dilauroyl peroxide, and bis-3,5,5-trimethyl hexanoyl peroxide; peroxyesters selected from the group consisting of t-butyl peroxy pivalate, t-amyl peroxypivalate, t-butyl peroxy-2-ethyl hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecanoate, 1,1,3,3-tetramethyl butyl 2-ethylhexanoate, t-amylperoxy 2-ethyl hexanoate, t-butyl peroxy isobutyrate, t-amylperoxy 3,5,5-trimethyl hexanoyl, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate; and azo-based compounds selected from the group consisting of 2,2'-azo-bis(2,4-dimethylvaleronitrile) and 1,1'-azo-bis(cyanocyclo-hexane).

31. The rechargeable lithium battery of claim 20, wherein the lithium salt is selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ where, x and y are natural numbers, $LiSO_3CF_3$, and mixtures thereof.

32. The rechargeable lithium battery of claim 20, wherein the electrolyte further comprises an additive selected from the group consisting of a substituted carbonate with a substitution group, vinylene carbonate, divinyl sulfone, ethylene sulfite, and combinations thereof, wherein the substitution group is selected from the group consisting of halogens, a cyano (CN) and a nitro ($NO_2$).

33. The rechargeable lithium battery of claim 32, wherein the additive is a substituted carbonate with a substitution group selected from the group consisting of halogens, a cyano (CN) and a nitro ($NO_2$).

34. The rechargeable lithium battery of claim 33, wherein the substituted carbonate is represented by the formula:

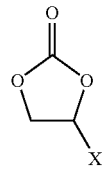

where X is selected from the group consisting of halogens, cyano (CN) and nitro ($NO_2$).

35. The rechargeable lithium battery of claim 34, wherein the substituted carbonate is fluoroethylene carbonate.

36. The rechargeable lithium battery of claim 20, wherein the positive active material is a nickel-based compound.

37. The rechargeable lithium battery of claim 36, wherein the positive active material is a nickel-based compound represented by formulas 6 or 7:

   (6)

   (7)

where $0.90 \leq x \leq 1.1$, $0.1 \leq y \leq 0.9$, and $0 \leq z \leq 0.5$; M is selected from the group consisting of Al, Ni, Go, Mn, Cr, Fe, Mg, Sr, V, rare earth elements and combinations thereof; A is selected from O, F, S or P; and X is F, S or P.

38. The rechargeable lithium battery of claim 20, wherein the positive active material is a nickel-based compound, or a mixture of a nickel-based compound and, a cobalt-based compound or a manganese-based compound.

39. An electrolyte for a rechargeable lithium battery comprising:

a non-aqueous organic solvent comprising 70 to 95 volume % of an ester-based solvent comprising a cyclic ester comprising 10 to 40 volume % of ethylene carbonate and 5 to 30 volume % of a nitrile-based solvent represented by formula (1); and a lithium salt $$R-C\equiv N \quad (1)$$

where R is selected from the group consisting of $C_1$ to $C_{10}$ aliphatic hydrocarbons, $C_1$ to $C_{10}$ halogenated aliphatic hydrocarbons, $C_6$ to $C_{10}$ aromatic hydrocarbons, and $C_6$ to $C_{10}$ halogenated aromatic hydrocarbons.

40. The electrolyte of claim 39, wherein the non-aqueous organic solvent includes 75 to 90 volume % of the ester-based solvent comprising the cyclic ester, and the nitrile-based solvent from 10 to 25 volume %.

41. The electrolyte of claim 39, wherein the cyclic ester includes 30 to 85 volume % of a solvent selected from the group consisting of propylene carbonate, butylene carbonate, γ-butyrolactone, γ-valerolactone, γ-caprolactone, δ-valerolactone, ∈-caprolactone, and mixtures thereof, and wherein the cyclic ester is present in an amount from 70 to 95 volume %.

42. The electrolyte of claim 41, wherein the cyclic ester includes 10 to 15 volume % of ethylene carbonate, and 55 to 85 volume % of a solvent selected from the group consisting of propylene carbonate, butylene carbonate, γ-butyrolactone, γ-valerolactone, γ-caprolactone, δ-valerolactone, ∈-caprolactone, and mixtures thereof, and wherein the cyclic ester is present in an amount from 70 to 95 volume %.

43. The electrolyte of claim 39, wherein R is selected from the group consisting of $C_3$ to $C_8$ aliphatic hydrocarbons and $C_3$ to $C_8$ halogenated aliphatic hydrocarbons.

44. The electrolyte of claim 39, wherein the nitrile-based solvent is selected from the group consisting of acetonitrile, propionitrile, butyronitrile, t-butyl cyanide, valeronitrile, caprylonitrile, heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, and 4-fluorophenylacetonitrile.

45. The electrolyte of claim 39, wherein the organic solvent further comprises a linear ester in an amount up to 70 parts by volume based on 100 parts by volume of the total cyclic ester and the nitrile-based solvent.

46. The electrolyte of claim 45, wherein the linear ester is selected from the group consisting of dimethyl carbonate, ethyl methyl carbonate, diethyl carbonate, dipropyl carbonate, dibutyl carbonate, methyl acetate, ethyl acetate, methyl hexanoate, methyl formate, and mixtures thereof.

47. The electrolyte of claim 38, wherein the electrolyte further includes a monomer and a polymerization initiator.

48. The electrolyte of claim 47, wherein the monomer is a first monomer and the electrolyte further includes a second monomer, wherein:

the first monomer has at least two functional groups at a terminal end thereof, one functional group selected from the group consisting of unsaturated groups represented by formulas 2 to 4, and the first monomer has a molecular weight from 100 to 10,000; and the second monomer has one functional group selected from the group consisting of an unsaturated bond represented by formulas 2 to 4, and the second monomer has a molecular weight from 100 to 10,000:

$$(R_1)(R_2)C=C(R_3)-C(=O)- \quad (2)$$

$$(R_1)(R_2)C=C(R_3)- \quad (3)$$

$$(R_1)(R_2)C=C(R_3)-CH_2- \quad (4)$$

where, $R_1$, $R_2$ and $R_3$ are the same or are independently selected from the group consisting of H, $C_2$ to $C_{10}$ aliphatic and aromatic hydrocarbons, —C≡N, and —$OR_5$, where $R_5$ is selected from the group consisting of H, $CH_3$, $C_2H_5$, —F, —Cl and Br.

49. The electrolyte of claim 47, wherein the polymer electrolyte includes 0.01 to 20 wt % of the monomer.

50. The electrolyte of claim 47, wherein the polymerization initiator is an organic peroxide or an azo-based compound.

51. The electrolyte of claim 50, wherein the polymerization initiator is selected from the group consisting of peroxy dicarbonates selected from the group consisting of di(4-t-butylcyclohexyl)peroxydicarbonate, di-2-ethylhexyl peroxy dicarbonate, di-isopropyl peroxydicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, and diethylene glycol-bis(t-butyl peroxy carbonate); diacyl peroxides selected from the group consisting of diacetyl peroxide, dibenzoyl peroxide, dilauroyl peroxide, and bis-3,5,5-trimethyl hexanoyl peroxide; peroxyesters selected from the group consisting of t-butyl peroxy pivalate, t-amyl peroxypivalate, t-butyl peroxy-2-ethyl hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecanoate, 1,1,3,3-tetramethyl butyl 2-ethylhexanoate, t-amylperoxy 2-ethyl hexanoate, t-butyl peroxy isobutyrate, t-amylperoxy 3,5,5-trimethyl hexanoyl, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate; and azo-based compounds selected from the group consisting of 2,2'-azo-bis(2,4-dimethylvaleronitrile) and 1,1'-azo-bis(cyanocyclo-hexane).

52. The electrolyte of claim 39, wherein the lithium salt is selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ where, x and y are natural numbers, $LiSO_3CF_3$, and mixtures thereof.

53. The electrolyte of claim 39, wherein the electrolyte further comprises an additive selected from the group consisting of a substituted carbonate with a substitution group, vinylene carbonate, divinyl sulfone, ethylene sulfite, and combinations thereof, wherein the substitution group is selected from the group consisting of halogens, a cyano (CN) and a nitro ($NO_2$).

54. The electrolyte of claim 52, wherein the additive is a substituted carbonate with a substitution group selected from the group consisting of halogens, a cyano (CN) and a nitro ($NO_2$).

55. The electrolyte of claim 54, wherein the substituted carbonate is represented by the formula:

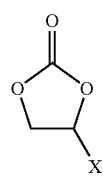

where X is selected from the group consisting of halogens, cyano (CN) and nitro (NO$_2$).

56. The electrolyte of claim 55, wherein the substituted carbonate is fluoroethylene carbonate.

57. The electrolyte of claim 54, wherein the additive is present in an amount between 0.01 and 10 parts by weight based on 100 parts by weight of the total electrolyte.

58. A rechargeable lithium battery comprising:
a positive electrode comprising a Nickel-based positive active material;
a negative electrode comprising a negative active material in which lithium intercalation reversibly occurs;
an electrolyte comprising an organic solvent and a lithium salt, the organic solvent comprising 70 to 95 volume % of an ester-based solvent comprising a cyclic ester and 5 to 30 volume % of a nitrile-based solvent represented by the formula:

R—C≡N where R is selected from the group consisting of C$_1$ to C$_{10}$ aliphatic hydrocarbons, C$_1$ to C$_{10}$ halogenated aliphatic hydrocarbons, C$_6$ to C$_{10}$ aromatic hydrocarbons, and C$_6$ to C$_{10}$ halogenated aliphatic hydrocarbons.

59. The rechargeable lithium battery of claim 58, wherein the non-aqueous organic solvent includes 75 to 90 volume % of the ester-based solvent comprising the cyclic ester and 10 to 25 volume % of the nitrile-based solvent.

60. The rechargeable lithium battery of claim 58, wherein the cyclic ester includes 10 to 40 volume % of ethylene carbonate, and 30 to 85 volume % of a solvent selected from the group consisting of propylene carbonate, butylene carbonate, γ-butyrolactone, γ-valerolactone, γ-caprolactone, δ-valerolactone, ∈-caprolactone, and mixtures thereof, and wherein the cyclic ester is present in a total amount of 70 to 95 volume %.

61. The rechargeable lithium battery of claim 60, wherein the cyclic ester includes 10 to 15 volume % of ethylene carbonate, and 55 to 85 volume % of a solvent selected from the group consisting of propylene carbonate, butylene carbonate, γ-butyrolactone, γ-valerolactone, γ-caprolactone, δ-valerolactone, ∈-caprolactone, and mixtures thereof, and wherein the cyclic ester is present in a total amount of 70 to 95 volume %.

62. The rechargeable lithium battery of claim 58, wherein R is selected from the group consisting of C$_3$ to C$_8$ aliphatic hydrocarbons and C$_3$ to C$_8$ halogenated aliphatic hydrocarbons.

63. The rechargeable lithium battery of claim 58, wherein the nitrile-based solvent is selected from the group consisting of acetonitrile, propionitrile, butyronitrile, t-butyl cyanide, valeronitrile, caprylonitrile, heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, 4-fluorophenylacetonitrile and mixtures thereof.

64. The rechargeable lithium battery of claim 58, wherein the organic solvent further comprises a linear ester in an amount up to 70 parts by volume based on 100 parts by volume of the total cyclic ester and the nitrile-based solvent.

65. The rechargeable lithium battery of claim 58, wherein the electrolyte further includes a monomer and a polymerization initiator.

66. The rechargeable lithium battery of claim 65, wherein the monomer is a first monomer and the electrolyte further includes a second monomer, wherein:
the first monomer has at least two functional groups at a terminal end thereof, one functional group selected from the group consisting of unsaturated groups represented by formulas 2 to 4, and the first monomer has a molecular weight from 100 to 10,000; and
the second monomer has one functional group selected from the group consisting of unsaturated bond represented by formulas 2 to 4, and the second monomer has a molecular weight from 100 to 10,000:

$(R_1)(R_2)C=C(R_3)—C(=O)—$     (2)

$(R_1)(R_2)C=C(R_3)—$     (3)

$(R_1)(R_2)C=C(R_3)—CH_2—$     (4)

where, $R_1$, $R_2$ and $R_3$ are the same or are independently selected from the group consisting of H, C$_2$ to C$_{10}$ aliphatic or aromatic hydrocarbons, —C≡N, and —OR$_5$, where R$_5$ is selected from the group consisting of H, CH$_3$, C$_2$H$_5$, —F, —Cl and Br.

67. The rechargeable lithium battery of claim 58, wherein the polymerization initiator is an organic peroxide or an azo-based compound.

68. The rechargeable lithium battery of claim 67, wherein the polymerization initiator is selected from the group consisting of peroxy dicarbonates selected from the group consisting of di(4-t-butylcyclohexyl)peroxydicarbonate, di-2-ethylhexyl peroxy dicarbonate, di-isopropyl peroxydicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, and diethylene glycol-bis(t-butyl peroxy carbonate); diacyl peroxides selected from the group consisting of diacetyl peroxide, dibenzoyl peroxide, dilauroyl peroxide, and bis-3,5,5-trimethyl hexanoyl peroxide; peroxyesters selected from the group consisting of t-butyl peroxy pivalate, t-amyl peroxypivalate, t-butyl peroxy-2-ethyl hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecanoate, 1,1,3,3-tetramethyl butyl 2-ethylhexanoate, t-amylperoxy 2-ethyl hexanoate, t-butyl peroxy isobutyrate, t-amylperoxy 3,5,5-trimethyl hexanoyl, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate; and azo-based compounds selected from the group consisting of 2,2'-azo-bis(2,4-dimethylvaleronitrile) and 1,1'-azo-bis(cyanocyclo-hexane).

69. The rechargeable lithium battery of claim 58, wherein the lithium salt is selected from the group consisting of LiPF$_6$, LiBF$_4$, LiSbF$_6$, LiAsF$_6$, LiClO$_4$, LiCF$_3$SO$_3$, LiN(CF$_3$SO$_2$)$_2$, LiN(C$_2$F$_5$SO$_2$)$_2$, LiAlO$_4$, LiAlCl$_4$, LiN(C$_x$F$_{2x+1}$SO$_2$)(C$_y$F$_{2y+1}$SO$_2$) where, x and y are natural numbers, LiSO$_3$CF$_3$, and mixtures thereof.

70. The rechargeable lithium battery of claim 58, wherein the electrolyte further comprises an additive selected from the group consisting of a substituted carbonate with a substitution group, vinylene carbonate, divinyl sulfone, ethylene sulfite, and combinations thereof, wherein the substitution group is selected from the group consisting of halogens, a cyano (CN) and a nitro (NO$_2$).

71. The rechargeable lithium battery of claim 70, wherein the substituted carbonate is represented by the formula:

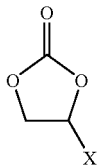

where X is selected from the group consisting of halogens, cyano (CN) and nitro ($NO_2$).

72. The rechargeable lithium battery of claim 71, wherein the substituted carbonate is fluoroethylene carbonate.

73. The rechargeable lithium battery of claim 58, wherein the positive active material is a nickel-based compound represented by formulas 6 or 7:

$$Li_xNi_yM_{1-y}A_2 \qquad (6)$$

$$Li_xNi_yM_{1-y}O_{2-z}X_z \qquad (7)$$

where $0.90 \leq x \leq 1.1$, $0.1 \leq y \leq 0.9$, and $0 \leq z \leq 0.5$; M is selected from the group consisting of Al, Ni, Go, Mn, Cr, Fe, Mg, Sr, V, rare earth elements and combinations thereof; A is selected from the group consisting of O, F, S and P; and X is F, S or P.

* * * * *

UNITED STATES PATENT AND TRADEMARK OFFICE
CERTIFICATE OF CORRECTION

| | | |
|---|---|---|
| PATENT NO. | : 7,718,322 B2 | |
| APPLICATION NO. | : 10/924248 | |
| DATED | : May 18, 2010 | |
| INVENTOR(S) | : Yong-Beom Lee et al. | |

It is certified that error appears in the above-identified patent and that said Letters Patent is hereby corrected as shown below:

Column 22, Claim 37, line 59   Delete "Go" Insert -- Co --

Column 28, Claim 73, line 7    Delete "Go" Insert -- Co --

Signed and Sealed this
Ninth Day of August, 2011

David J. Kappos
*Director of the United States Patent and Trademark Office*